Patented Oct. 18, 1932

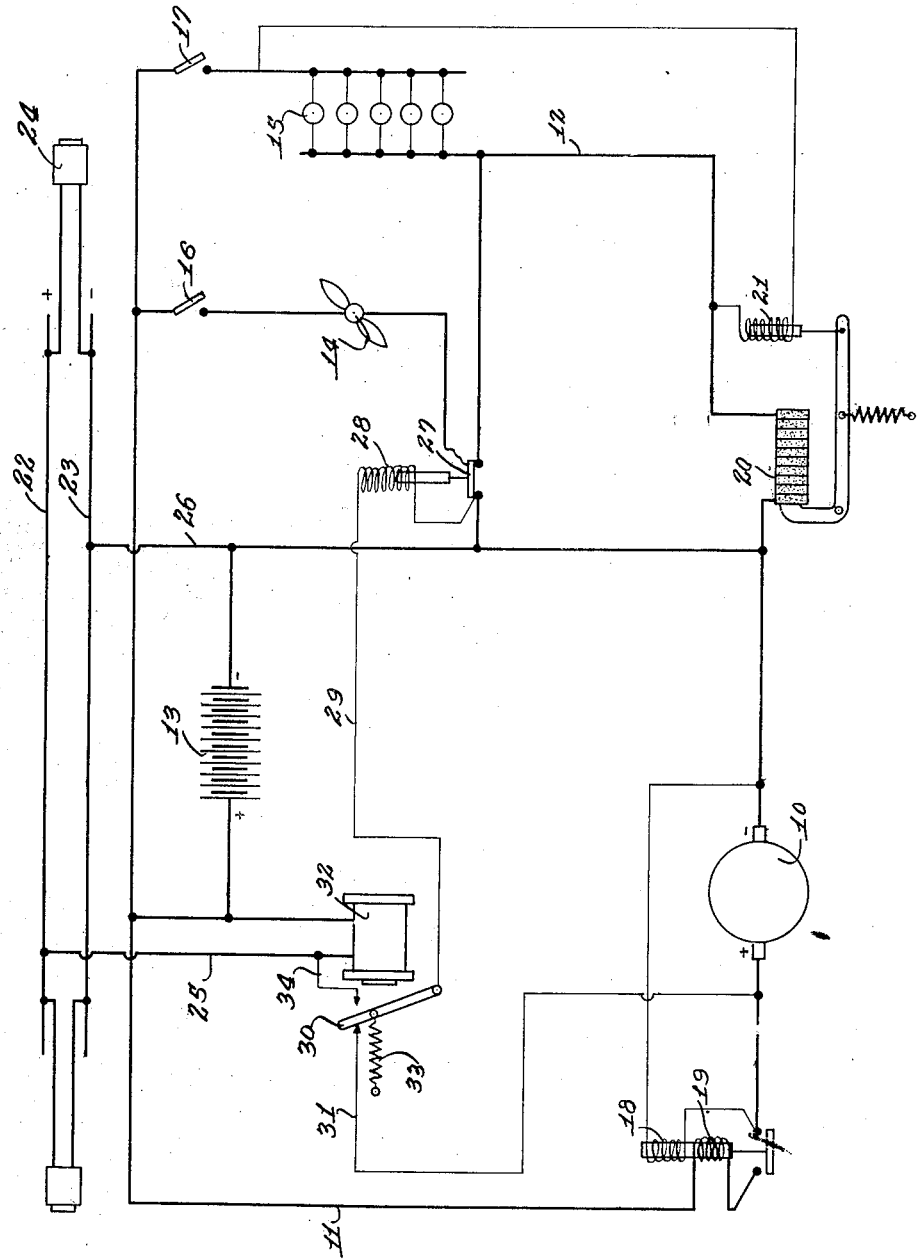

1,883,198

UNITED STATES PATENT OFFICE

PHILIP S. WESTCOTT, OF CHICAGO, ILLINOIS, ASSIGNOR TO THE PYLE-NATIONAL COMPANY, OF CHICAGO, ILLINOIS, A CORPORATION OF NEW JERSEY

ELECTRICAL DISTRIBUTION REGULATING SYSTEM FOR RAILWAY CARS

Application filed December 18, 1930. Serial No. 503,144.

This invention relates to improvements in a regulating system for use in connection with the distribution of electric current in railway cars.

The continued increase in the electric power demand in railway cars equipped with axle-generator systems has so taxed the generators, batteries, and regulator equipment as to make the restricting of unnecessarily wasted power of prime importance. The principal source of power waste in these systems results from the fundamental voltage drop through the carbon piles of the conventional lamp regulator, when this regulator is so connected as to remain in the circuit during such times as the load is being supplied from the battery.

This loss of power during battery operation is particularly evident by dimming of the lights, slowing down of ventilating fans and unsatisfactory operation of radio receiving sets when the train is not moving or the speed of the train is not sufficient to increase the generator voltage to "cut in" value. As a result, the passengers are much annoyed and subjected to undesirable discomforts.

Another source of power waste results from the operation of the car ventilating fans after the train has reached a speed sufficient to properly ventilate the cars. While the continued operation of the ventilating fans is not particularly objectionable to the passengers, their operation, when not needed, uses power which might advantageously be used in charging the battery or for other service.

To this end and in order to overcome the foregoing as well as other objections to the present regulating systems in railway cars, it is a primary object of this invention to provide means whereby any load on the distribution system, which would result in the unnecessary waste of power, is automatically cut out during such times as it is not required.

It is a further object of this invention to provide in a regulating system for railway cars, means for automatically cutting out the train ventilating fans as soon as the train has attained sufficient speed to properly ventilate the cars, thereby making available additional power for other purposes.

Another object of this invention is to provide in a regulating system, means for automatically short-circuiting the lamp regulator during battery discharge until either the train speed has increased generator voltage to normal value or the train is connected to a wayside source of power in which the voltage is above that of the battery.

In accordance with the general features of my invention, I propose to provide a voltage controlled relay the contacts of which are connected so as to normally short circuit the lamp regulator when the operation coil of the relay is deenergized. The coil of this relay is energized through the normally closed contacts of a selector relay having an operating coil which is responsive to the flow of current from the wayside source of power to the battery. The coil of the selector relay will be energized whenever the voltage from the wayside source of power is above the battery voltage. The contacts of the selector relay are so arranged that normally the voltage coil of the regulator short-circuiting relay is energized by generator voltage. However, as soon as the car is connected to a wayside source of power, having voltage above the battery voltage, the coil of the selector relay is energized and the coil of the regulator short-circuiting relay is then energized from the wayside source of power. With this arrangement, it will be observed that the selector relay and the regulator short-circuiting relay are not consuming power for operation at any time except when operating power is available from either outside source or axle generator, and this requirement is comparatively negligible.

Another feature of this invention resides in the manner in which the ventilating fans are shut down as soon as the speed of the train has increased sufficiently to properly ventilate the cars. Since the voltage of the axle-generator is proportional to the speed at which the train is traveling, and since the regulator short-circuiting relay functions in response to the voltage generated, I propose to complete the circuit of the ventilating fans through the contacts of the regulator short-circuiting relay and thus control the operation of the fans in accordance with the voltage generated by the generator or the speed of the train.

Other objects and features of this invention will more fully appear from the following detailed description taken in connection with the accompanying drawing which illustrates a single embodiment thereof, and in which The figure diagrammatically represents a system embodying the features of my invention.

As shown on the drawing:

In the illustrated system embodying the features of my invention, there is shown a variable speed generator 10 which is adapted to be driven from the axle of a car. The positive and negative generator leads 11 and 12 respectively supply a storage battery 13 and a plurality of translating devices arranged in parallel circuits, such as the ventilating fans 14 and the lamps 15. Individual switches 16 and 17 are provided for selectively throwing the translating devices in and out of circuit.

A conventional reverse current relay or switch is connected in one of the generator leads, in this instance being illustrated as connected in the positive lead of the generator. This switch is controlled by means of a voltage coil 18 which is connected directly to the generator, and a current coil 19 in the positive lead 11 of the generator, the current coil being arranged to be energized through the contacts of the relay. This relay will connect the generator to the system when the generator voltage reaches substantially normal value, and will disconnect the generator when its voltage falls below the normal value or upon reversal of current through the current coil of the relay.

Regulation of the voltage in the load circuit is accomplished by means of a variable resistance, herein illustrated as a compressible carbon pile lamp regulator 20 of conventional type, in series with the translating devices. The operating coil 21 in this instance is connected across the lamp circuit in parallel with the lamps so that as the lamp voltage increases the regulator will function to insert more resistance into the circuit to decrease the lamp voltage. Conversely, as the voltage across the lamps decreases, the regulator will function to decrease the resistance and raise the voltage across the lamps.

Train lines are illustrated as being composed of conductors 22 and 23 to which there is connected a charging receptacle 24. The charging receptacle enables the connection of an outside or wayside source of current supply to the storage battery 13 which is connected to the conductors 22 and 23 respectively by leads 25 and 26.

Since it is not desirable to have the lamp regulator in circuit when the lamps are being fed from the battery, there is provided a regulator short-circuiting relay having contacts which are normally closed by an armature 27 to bridge or short circuit the regulator. One side of the voltage operating coil 28 of this relay is connected to the negative side of the circuit, the negative side being common to the generator, battery and train lines. The other side of the coil 28 is normally connected to the positive side of the generator through the following circuit: conductor 29, armature 30 of a selector relay and thence through conductor 31 to the positive side of the generator 10.

The current operating coil of a magnet 32 of the selector relay is connected in lead 25 from train line 22 to the positive side of the battery, so that any current flowing from the train line to the battery will energize the coil of this relay. The armature 30 of the selector relay is normally held in such position as to be electrically connected to conductor 31 by means of a spring 33. When the selector relay is energized, the armature 30 is attracted and connection is made to conductor 34 which is connected to conductor 25. During such times as the selector relay is energized, the operating coil 28 of the regulator short-circuiting relay is fed from train line 22, through conductor 25, conductor 34, armature 30, conductor 29, coil 28, and thence to the negative side of the system, which is common with the train line 23.

It is therefore evident that the coil 28 of the regulator short-circuiting relay will be energized selectively from the generator 10 or the wayside source of power depending upon which is being used.

The coil 28 is arranged so that the short-circuiting relay will be operated so as to insert the regulator in the circuit when substantially normal voltage is applied thereto. Moreover, when the coil 28 is connected to the generator 10 and the generator is operating at a speed insufficient to energize the coil 28 with normal voltage, then the armature 27 will bridge the contacts of the short-circuiting relay and short circuit the lamp regulator. It will thus be seen that advantage may be taken of the operation of the short-circuiting relay to disconnect the ventilating fans when the speed of the train is such that the generator 10 will furnish normal voltage, the speed of the train at this time being sufficient to ventilate the cars without the necessity of having to operate the fans. To this end, the fan circuit is connected to the armature of the short-circuiting relay, so that when this relay is closed the fan circuit is completed.

The operation of the regulating system embodying the features of my invention is as follows:

The operation of the system will be considered from the standpoint of three sets of operating conditions, namely, (A) With the car standing or moving at a speed such that the generator will not produce sufficient voltage to cause the reverse current relay to cut in and connect the generator to the load circuit. No external power supply is connected, the power supply being from the battery. Under these conditions, the undesirable power loss due to the lamp regulator is eliminated by short-circuiting the regulator through the contacts and armature 27 of the short-circuiting relay. The coil 28 of this relay will not operate the relay since this coil at this time will be connected to the generator and will not function since the generator voltage is below normal value, the coil 28 being arranged to operate the relay only when the voltage applied thereto is of substantially normal voltage. At this time, the short-circuiting relay being closed, the ventilating fans will be running, since the armature has completed the supply circuit for the fans.

(B) If the train speed is increased to such an extent that the generator voltage is above the normal or "cut in" voltage, then the regulator short-circuiting relay will operate and the reverse current relay will close. Under these conditions the operating coil of the short-circuiting relay is energized from the positive side of the generator through conductor 31, armature 30, conductor 29, the relay coil 28, and thence to the negative side of the generator. Since the regulator is now in the circuit, the regulator will function to take care of variations of voltage. Opening of the short-circuit relay functions to disconnect the ventilating fans whereupon the fans will be shut down. It is important to note that under these conditions the train is moving at a sufficient speed so that the fans are not needed. Shutting down of the fans at this time results in the saving of power for other purposes, which would otherwise be wasted.

(C) Let us now consider that the car is standing in the yard and that the train lines are connected to an outside source of power through the yard charging receptacle 24. Under these conditions, if the voltage at the wayside source is above that of the battery, current will flow to the battery through conductor 25 having the current coil of the magnet 32 therein. The magnet 32 is therefore energized and will attract the armature 30, this action of the armature breaking the connection of the armature with conductor 31 and establishing connection of the armature with conductor 34 which is connected to the conductor 35. If the wayside voltage is above cut-in value, the coil 28 of the short-circuiting relay is energized and the relay operates as in the case when the generator is furnishing voltage above the cut-in value, thereby enabling the regulator 20 to perform its function in regulating the voltage of the lamps. Also the fans are disconnected with the result that power is not wasted. It is important to note that there is no drain on the battery under these conditions of operation, since the coil 28 is connected to the wayside source of power only at such times as current flows in the coil 32, which is when the wayside voltage is above the battery voltage.

It will be apparent from the foregoing that this invention provides a regulating system whereby any load on the system, which would result in the unnecessary waste of power is automatically cut-out during such times as it is not required; which automatically cuts out the car ventilating fans as soon as the train has attained sufficient speed to properly ventilate the cars; and which automatically short-circuits the lamp regulator during battery discharge.

Now, it is of course to be understood that although I have described in detail the preferred embodiment of my invention, the invention is not to be thus limited but only insofar as defined by the scope and spirit of the appended claims.

I claim:

1. In a system containing a variable speed generator, a storage battery and an auxiliary power supply circuit connected to a translating circuit, and a regulator for said latter circuit; a relay having contacts normally short-circuiting the regulator, a voltage coil for operating said relay, said coil being connected across the generator, and means for automatically connecting said operating coil to the auxiliary supply circuit, when current flows from the auxiliary supply circuit to the battery.

2. In a system containing a variable speed generator, a storage battery and an auxiliary power supply circuit connected to a translating circuit, and a regulator for said latter circuit; a voltage controlled switch for cutting out the regulator when the battery is carrying the load, and a current controlled switch adapted to change the excitation of the voltage controlled switch from the generator to the auxiliary power supply circuit when the battery is being charged therefrom.

3. In a system containing a variable speed generator, a storage battery and an auxiliary power supply circuit connected to a translating circuit, and a regulator for said latter circuit; means for cutting out the regulator when the battery is carrying the load, and automatic means for controlling said first means selectively responsive to generator charging or auxiliary power supply circuit charging of the battery.

4. In a system containing a variable speed generator, a storage battery and an auxiliary power supply circuit connected to a translating circuit, and a regulator for said latter circuit; a voltage controlled switch for cutting out the regulator when the battery is carrying the load, a selector relay having one set of contacts normally connecting the voltage controlled switch to the generator, and another set of contacts for connecting the switch to the auxiliary power supply, and a current coil on said relay in the battery connection to the auxiliary power supply, said coil being energizable by flow of current from the auxiliary power supply to the battery.

5. In a system containing a variable speed generator, a storage battery, and a plurality of working circuits; a regulator in one of said circuits, means for shorting out the regulator when power supply is from the battery and cutting in the regulator when the generator voltage is increased to normal value, one of said circuits being connected to the generator through said means, whereby said circuit is energized and deenergized depending upon whether power is supplied from the generator or the battery.

6. In a system containing a variable speed generator a storage battery, a lamp circuit, a fan circuit; a regulator connected to the lamp circuit, means for shorting out the regulator when power supply is from the battery and cutting in the regulator when the generator voltage is increased to normal value, the fan circuit being connected to the generator through said means, whereby said fan circuit is energized and deenergized depending upon whether power is supplied from the generator or the battery.

Signed at Chicago county of Cook and State of Illinois, this 16th day of December 1930.

PHILIP S. WESTCOTT.